United States Patent [19]

Fredriksen et al.

[11] 4,427,090
[45] Jan. 24, 1984

[54] AGRICULTURAL MACHINE WITH DISPLACEABLE CABIN

[75] Inventors: Nils Fredriksen, Harsewinkel; Heinrich Wecker, Paderborn, both of Fed. Rep. of Germany

[73] Assignee: Claas OHG, Harsewinkel, Fed. Rep. of Germany

[21] Appl. No.: 283,664

[22] Filed: Jul. 15, 1981

Related U.S. Application Data

[63] Continuation-in-part of Ser. No. 279,037, Jun. 30, 1981, abandoned.

[30] Foreign Application Priority Data

Jun. 30, 1980 [DE] Fed. Rep. of Germany ....... 3024664

[51] Int. Cl.$^3$ ............................................. B62D 33/06
[52] U.S. Cl. .................................. 180/327; 180/89.13; 296/190
[58] Field of Search ............... 180/326, 327, 328, 329, 180/89.12, 89.13; 280/456 A, 461 A, DIG. 8; 296/190; 56/15.6, 228, DIG. 9

[56] References Cited

U.S. PATENT DOCUMENTS

| | | | |
|---|---|---|---|
| 3,720,047 | 3/1973 | van der Lely | 180/327 X |
| 3,721,077 | 3/1973 | van der Lely | 180/327 X |
| 3,891,264 | 6/1975 | Hunter et al. | 180/89.12 X |
| 3,957,165 | 5/1976 | Smith | 180/327 X |
| 3,963,132 | 6/1976 | Dufour | 180/89.13 X |
| 4,082,343 | 4/1978 | Hurt et al. | 180/89.12 X |
| 4,271,921 | 6/1981 | Ochsner | 180/89.12 |
| 4,275,918 | 6/1981 | Franco | 296/190 |

FOREIGN PATENT DOCUMENTS 2078634 1/1982 United Kingdom ................ 296/190

*Primary Examiner*—Joseph F. Peters, Jr.
*Assistant Examiner*—Mitchell J. Hill
*Attorney, Agent, or Firm*—Michael J. Striker

[57] ABSTRACT

A multiple-purpose agricultural machine, particularly a tractor, has a chassis, supporting elements associated with the chassis, a driver's cabin movable relative to the chassis between at least two working positions spaced from one another and detachably mounted on the supporting elements so that it can be detached from the supporting elements for movement between the working positions, and mounting elements for detachably mounting the driver's cabin on the supporting elements. The supporting elements may be formed as two receiving elements fixedly mounted on the machine and arranged to be alternately coupled with the driver's cabin, or has elements provided on an implement which is connected with the tractor.

22 Claims, 6 Drawing Figures

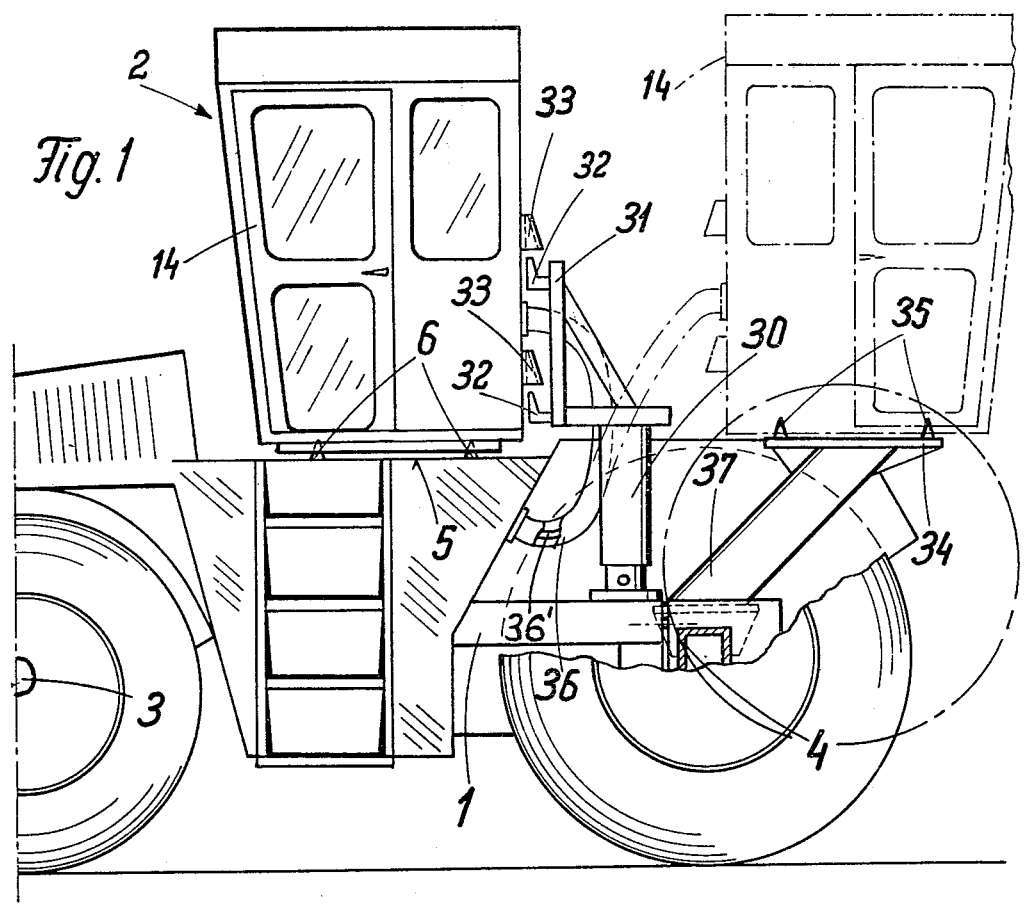
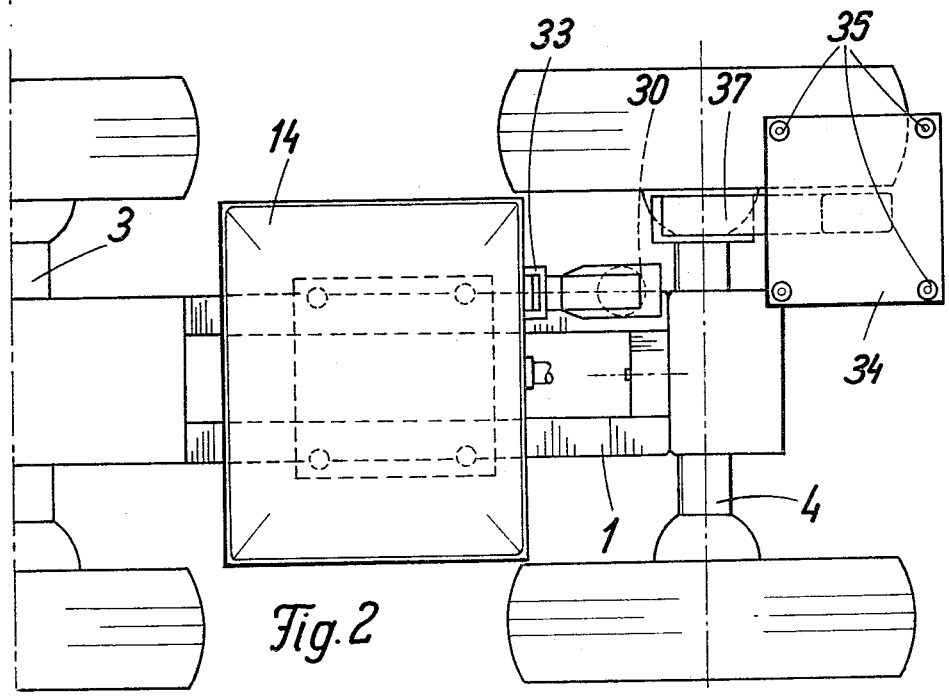

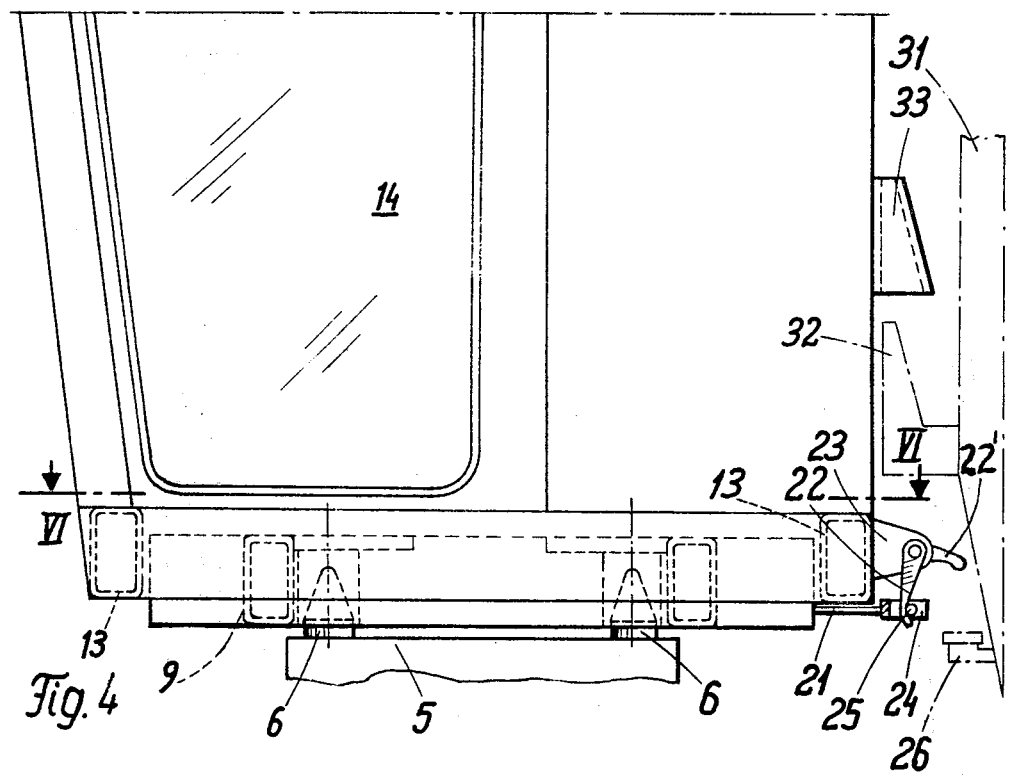
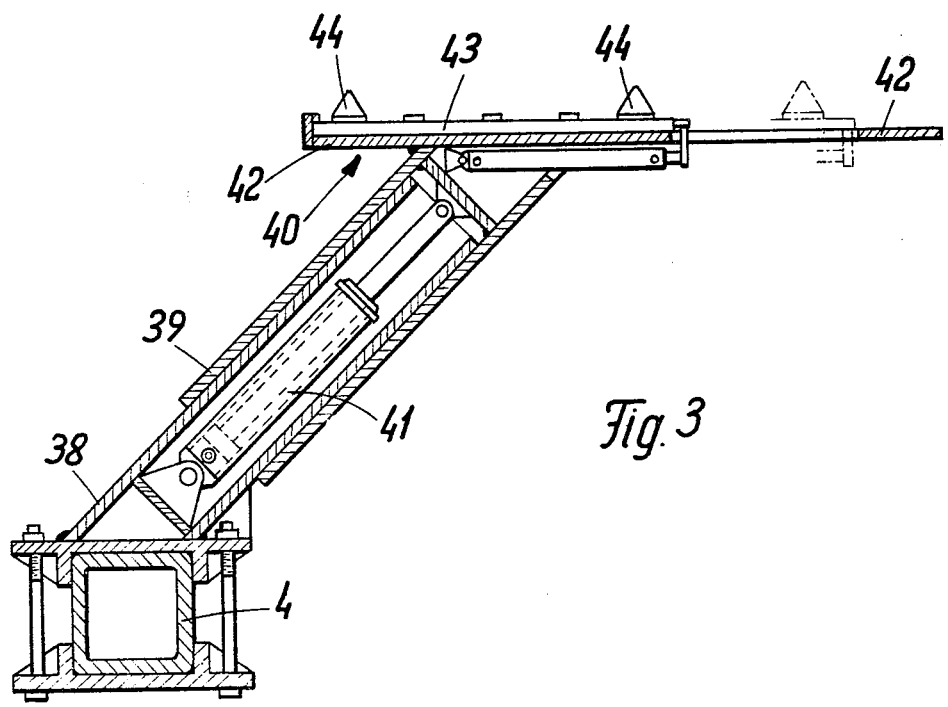

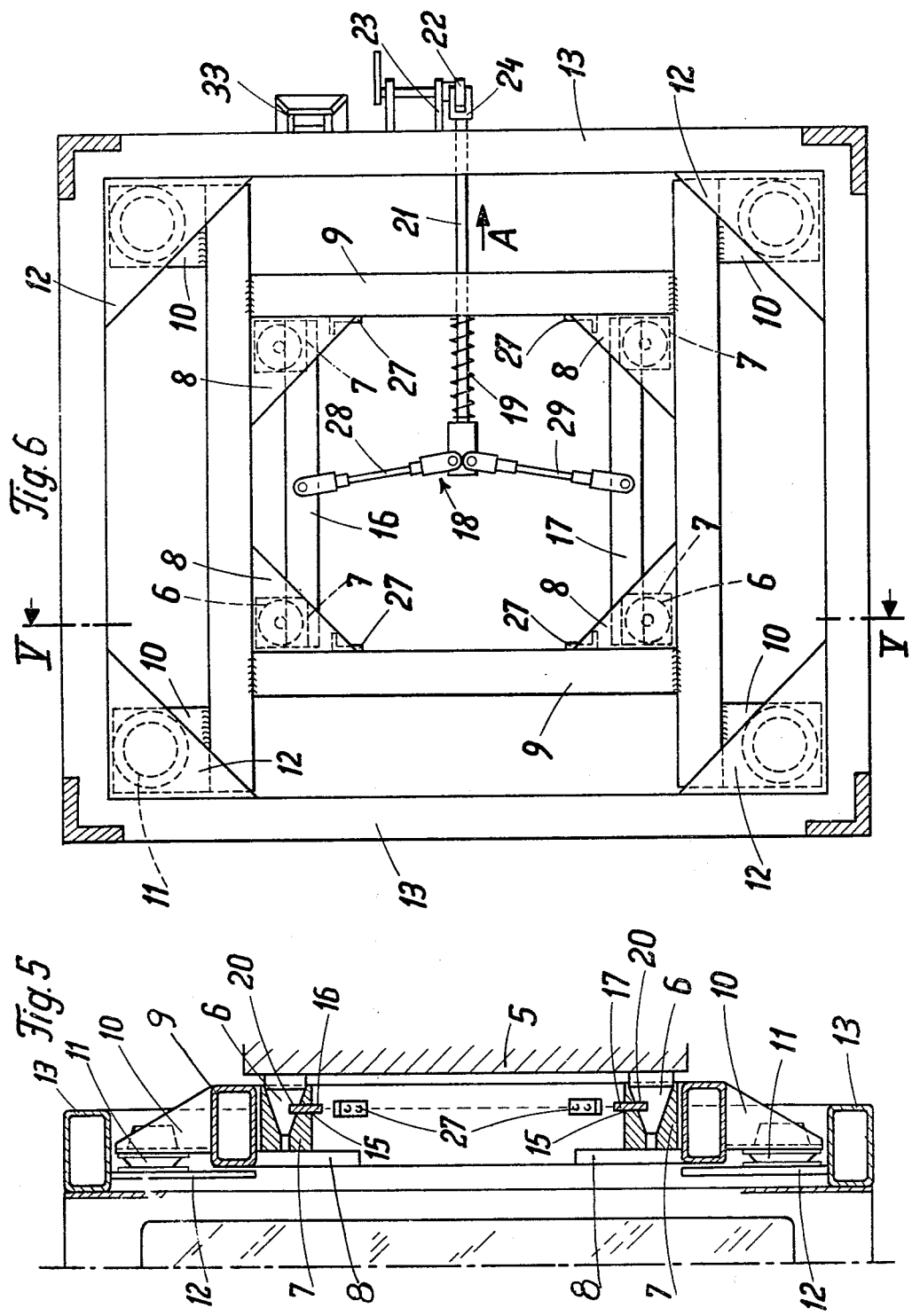

AGRICULTURAL MACHINE WITH DISPLACEABLE CABIN

CROSS-REFERENCE TO RELATED APPLICATION

This application is a continuation-in-part application of our copending application Ser. No. 279,037, filed June 30, 1981, now abandoned and entitled AGRICULTURAL MULTI PURPOSE VEHICLE.

BACKGROUND OF THE INVENTION

The present invention relates to a multiple-purpose agricultural machine, particularly a tractor. More particularly, it relates to a multiple-purpose agricultural machine with a control stand which is formed as a driver's cabin and provided with control and actuating devices.

Multiple-purpose agricultural machines of the above-mentioned general type are known in the art. In such machines, the control and actuating devices arranged in the driver's cabin are connected with the machine in a flexible manner, for example by an electric cable or hydraulic or pneumatic hose. One such machine is disclosed, for example, in German Patent No. 1,949,978. The multiple-purpose agricultural machine described in that patent has a driver's cabin which is supported on a pivotable arm so as to be pivoted between two working positions and arrested in the desired position. Such a construction has the disadvantage that because of the high loading of the pivotable arm it must have great dimensions so as to provide such a strength as to guarantee the capsize safety of the operator. A further disadvantage of this construction is that soil unevenness causes relative movement between the cabin when it is pivoted to the region of the swinging axis of the machine for observation or to the chopping unit, on the one hand, and the implement, on the other hand. This forms a hindrance for the driver and, in some conditions, also a hindrance for the free movement of the implement because of the cabin.

SUMMARY OF THE INVENTION

Accordingly, it is an object of the present invention to provide a multiple-purpose agricultural machine which avoids the disadvantages of the prior art.

More particularly, it is an object of the present invention to provide a multiple-purpose agricultural machine which has a sturdy and simple construction, operating in a satisfactory manner.

In keeping with these objects, and with others which will become apparent hereinafter, one feature of the present invention resides, briefly stated, in the fact that the driver's cabin of the multiple-purpose agricultural machine is detachably mounted on the supporting parts of the machine so as to be detached from these parts for displacement to each of at least two working positions.

In accordance with another feature of the present invention, the supporting parts are formed as two receiving elements fixedly mounted on the machine and arranged so that the driver's cabin can be coupled and arrested with the receiving elements.

In accordance with still another feature of the present invention, the driver's cabin is arranged to be coupled and arrested with an implement which is carried by or moved along with the machine.

In accordance with a further, especially advantageous feature of the present invention, one of the receiving elements is connected with the chassis of the machine, whereas the other receiving element is connected with the axle of the machine, and a lifting and turning device is provided for displacing the driver's cabin between two working positions.

When the multiple-purpose agricultural machine is designed in accordance with the present invention, the lifting device is loaded only when the cabin must be turned. This means that it may have small dimensions. The separate receiving elements or plates which are spaced from one another possess the advantage that they are fixedly connected with the chassis or the axle so that a strong hold can be guaranteed by a simple locking mechanism, on the one hand. On the other hand, it is possible to provide the support of the cabin, which in its working position is not connected with the lifting device, so that it is connected in a sound-insulating manner with the machine.

The novel features which are considered characteristic for the invention are set forth in particular in the appended claims. The invention itself, however, both as to its construction and its method of operation, together with addditional objects and advantages thereof, will be best understood from the following description of specific embodiments when read in connection with the accompanying drawing.

BRIEF DESCRIPTION OF THE DRAWING

FIG. 1 is a side view of a multiple-purpose agricultural machine in accordance with the present invention;

FIG. 2 is a plan view of the multiple-purpose agricultural machine shown in FIG. 1;

FIG. 3 is a view showing an encircled part of the machine in FIG. 1, in accordance with another embodiment of the invention;

FIG. 4 is a side view of the lower part of a driver's cabin of the machine, in accordance with the present invention;

FIG. 5 is a view showing the lower part of the driver's cabin in a section taken along the line V—V in FIG. 6; and FIG. 6 is a plan view of the lower part of the driver's cabin in a section taken along the line VI—VI in FIG. 4.

DESCRIPTION OF THE PREFERRED EMBODIMENTS

A multiple-purpose agricultural machine is identified in toto by reference numeral 2 and has a chassis 1 supported by a front steering axle and a rear swinging axle. The swinging axle 4 is connected with a not shown three-point suspension.

A first supporting plate 5 is fixedly connected to the chassis 1 and has four upwardly decreasing pins 6. Fitting pieces 7 are arranged on the pins 6 and fixedly welded with an intermediate frame 9 via connecting pieces 8. The intermediate frame 9 has outer consoles 10, and vibration-damping rubber elements 11 are screwed to the consoles. The other side of each vibration-damping element 11 is mounted on connecting pieces 12 which are welded with a base frame 13 of a driver's cabin 14.

For preventing unintentional loss of the fitting pieces 7 from the pins 6, the fitting pieces 7 are provided with slots 15, and two slots serve for guiding locking strips 16 and 17. Both locking strips are articulately connected with a linkage 18 which forces the strips 16 and 17, with the aid of a spring 19 abutting against the frame 9, so that the strips 16 and 17 extend through the slots 15 into recesses 20 of the pins 6. Thereby the pins 6 are locked with the fitting pieces 7. For releasing the locking connection, a rod 21 of the linkage 18 is pulled against the force of the spring 19 in the direction of the arrow A, as shown in FIG. 6, and an angular lever 22 which is pivotably mounted in one of brackets 23 is actuated. The brackets 23 are welded on the frame 13. The angular lever 22 engages with its one end behind a pin 25 which is supported in a fork 24, whereas the other end or second arm 22' of the angular lever is lifted by an adjustable abutment 26.

As can be seen from FIG. 6, abutments 27 are screwed on the intermediate frame 9. The abutments 27 serve for withdrawing the locking strips 16 and 17 from the recesses 20 via levers 28 and 29 which are articulately connected with the linkage 18. On the other hand, the abutments 27 limit the stroke of the strips 16 and 17 so that they are always held in the slots 15 of the fitting pieces 7. Since the rod 21 is movably supported in the frames 9 and 13, the entire locking mechanism is connected with the driver's cabin 14.

As can be seen from FIGS. 1 and 2, a hydraulic or pneumatic cylinder-and-piston unit 30 is mounted on a cross beam off a longitudinal center line of the chassis 1 (FIG. 2) and has a supporting arm 31. The supporting arm 31 is provided with two grippers 32 and with an adjustable abutment 26 shown in FIG. 4. When it is necessary to turn the cabin 14 from its first working position, shown in solid lines in FIG. 1, to its second working position, shown in dotted lines, the cylinder-and-piston unit is actuated so as to perform a lifting action. Thereby, the angular lever 22 is first turned by the abutment 26 and the frame 9 is unlocked from the plate 5. Simultaneously, the grippers 32 engage in two pocket-like members 33 provided on the driver's cabin 14 and lift the cabin 14 from the pins 6. After this, the cabin 14 is turned about a vertical central axis of the cylinder-and-piston unit 30 by hand or with the aid of a cylinder-and-piston unit formed as a rotary cylinder-and-piston unit. The turning is performed until the driver's cabin 14 is located above a second supporting plate 34 which is also provided with pins 35 similarly to the plate 5. The driver's cabin 14 is lowered onto the pins 35 so that the abutment 26 moves downwardly and releases the angular lever 22 which is again locked under the action of the spring 19. Plate 5 is located between the machine axles substantially centrally of the chassis 1. In contrast, the plate 34 is offset laterally so as to provide a sufficient space for mounting implements, on the one hand. On the other hand, the plate 34 extends rearwardly beyond the chassis 1, so that the driver can directly look at the mounted implement. The implement is connected via a not shown three-point suspension with the swinging axle 4, and the plate 34 is also connected with the axle 4 via a tubular element 37. Thereby no relative movement takes place between the driver's cabin 14 and the implement, which considerably facilitates the observation of the implement by the driver.

As can be seen from FIG. 1, a flexible hose 36 extends from the driver's cabin 14 to the machine. Control elements and conduits 36' required for the operation are accommodated in the hose 36. All control and actuating elements of the driver's cabin for the machine are exclusively electrical, electronic, hydraulic or pneumatic. In these conditions, the turning of the driver's cabin is possible without uncoupling of some or all control elements. An additional advantage is that the driver's cabin is connected with the machine without solid sound bridges. The sound-damping rubber elements 11 are provided for this purpose.

As can be seen from FIG. 3, instead of the tubular member 37 provided for supporting the plate 34 in FIG. 1, two telescopically displaceable tubular members 38 and 39 can be provided. The tubular member 38 is connected with the swinging axle 4, whereas the tubular member 39 is connected with a receiving element 40. The tubulars members 38 and 39 can be moved away from each other under the action of a cylinder-and-piston unit 41 associated with the tubular member 39. Thereby, the driver obtains a better visibility. The receiving element 40 is composed of a plate 42 which is provided with a guide and fixedly connected with the four-cornered tubular member 39, and a plate 43 provided with receiving pins 44 for the driver's cabin. The plate 43 can move relative to the plate 42 in a direction shown in FIG. 3. However, it can also move in a direction which is transverse to the shown direction. The plate 43 can be arrested with the plate 42. By displacement of the driver's cabin 14, the driver can be placed in a position which is favorable for observations.

It will be understood that each of the elements described above, or two or more together, may also find a useful application in other types of constructions differing from the types described above.

While the invention has been illustrated and described as embodied in a multiple-purpose agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multiple-purpose agricultural machine with a driver's cabin displaceable between at least two working positions, comprising a chassis; control means extending from the driver's cabin and being permanently connected to said chassis by flexible conduit means; at least two separate supporting means each provided on said chassis at a respective one of said working positions; means for detachably mounting said driver's cabin selectively on one of said supporting means; displacing means mounted on said chassis and being engageable with said driver's cabin to lift the same from said one supporting means and displace the cabin to the other supporting means; and means for locking the cabin in position on the selected supporting means.

2. An agricultural machine as defined in claim 1, wherein said supporting means includes at least two fixed receiving elements, said mounting means being arranged to alternately couple said driver's cabin with said receiving elements in said working positions and to arrest the cabin on the receiving elements.

3. An agricultural machine as defined in claim 1, wherein said displacing means for displacing said driver's cabin between said working positions includes a cylinder-and-piston unit connected with said chassis and arranged for lifting and turning said driver's cabin.

4. An agricultural machine as defined in claim 3, wherein said cylinder-and-piston unit of said displacing means is a pneumatic cylinder-and-piston unit.

5. An agricultural machine as defined in claim 3, wherein said cylinder-and-piston unit of said displacing means is a hydraulic cylinder-and-piston unit.

6. An agricultural machine as defined in claim 3, wherein said cylinder-and-piston unit has a movable part having a supporting arm provided with gripping means engageable with said driver's cabin for displacing the latter.

7. An agricultural machine as defined in claim 6, wherein said driver's cabin has lifting pocket members, said gripping means including two grippers engageable in said lifting pocket members of said driver's cabin.

8. An agricultural machine as defined in claim 3, wherein said chassis has a longitudinal center line, said cylinder-and-piston unit being connected with said chassis so that it is offset relative to said longitudinal center line of said chassis.

9. An agricultural machine as defined in claim 2; and further comprising two machine axles, said receiving elements being formed as supporting plates, one of said supporting plates being located between said machine axles substantially centrally of said chassis and connected with the latter, the other of said supporting plates being laterally offset relative to said chassis and connected with one of said machine axles.

10. An agricultural machine as defined in claim 9, wherein said other supporting plate extends rearwardly outwardly beyond said chassis.

11. An agricultural machine as defined in claim 2, wherein, said supporting means includes at least two supporting plates each connected with a respective one of said receiving elements, said driver's cabin being alternately connectable with each of said supporting plates by said mounting means.

12. An agricultural machine as defined in claim 2, and further comprising means for moving one of said receiving elements relative to said chassis.

13. An agricultural machine as defined in claim 12, wherein said moving means includes a supporting tubular element which supports said one receiving element and has two telescopically movable tubular members, and a cylinder-and-piston unit displacing said tubular members relative to one another.

14. An agricultural machine as defined in claim 13, wherein said one receiving element includes a first elongated plate connected with one of said tubular members and provided with a guide, and a second plate displaceable along and guided by said first plate and provided with receiving pins.

15. An agricultural machine as defined in claim 13, wherein said tubular members have a four-cornered cross section.

16. A multiple-purpose agricultural machine, particularly a tractor, comprising a chassis; supporting means associated with said chassis; a driver's cabin movable relative to said chassis between at least two working positions spaced from one another; means for detachably mounting said driver's cabin on said supporting means; said driver's cabin having a frame; said supporting means including at least two supporting plates each provided with fixed receiving elements formed as conical pins, said frame of said driver's cabin being alternately connectable with each of said supporting plates by said mounting means to alternately couple said driver's cabin with said receiving elements in said working positions; said mounting means including a plurality of fitting pieces engageable with said conical pins of said supporting plates; means for locking said conical pins in each of said working positions; said conical pins and said fitting pieces being provided with slots; and said locking means including a plurality of locking members each insertable in respective ones of said slots.

17. An agricultural machine as defined in claim 16; and further comprising a linkage, said locking members being supported and held in said slots of said fitting pieces and also on said linkage.

18. An agricultural machine as defined in claim 17, wherein said driver's cabin has an angular lever, said linkage including a rod having an end portion with a pin which is in operative connection with said angular lever of said driver's cabin so as to act upon said linkage and said locking members thereby.

19. An agricultural machine as defined in claim 18, wherein said driver's cabin has a bracket on which said angular lever is mounted.

20. An agricultural machine as defined in claim 18; and further comprising means for displacing said driver's cabin between said working positions and including a cylinder-and-piston unit having a movable part provided with a supporting arm which carries gripper means engageable with said driver's cabin and has an abutment member, said angular lever having a first arm which is in operative connection with said pin of said rod of said linkage and a second arm pivotable under the action of said abutment member of said supporting arm.

21. An agricultural machine as defined in claim 17; and further comprising means for urging said locking members to their locking position and including a spring.

22. An agricultural machine as defined in claim 21, wherein said spring is arranged so that it urges said linkage and thereby said locking members to their locking position.

* * * * *